US008839203B2

(12) United States Patent
Opstad et al.

(10) Patent No.: US 8,839,203 B2
(45) Date of Patent: Sep. 16, 2014

(54) CODE COVERAGE-BASED TAINT PERIMETER DETECTION

(75) Inventors: Edwin Lars Opstad, Bellevue, WA (US); Andrew Renk, Duvall, WA (US); Daniel Margolis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 13/115,985

(22) Filed: May 25, 2011

(65) Prior Publication Data

US 2012/0304010 A1    Nov. 29, 2012

(51) Int. Cl.
*G06F 9/44*    (2006.01)

(52) U.S. Cl.
USPC .......................................................... 717/128

(58) Field of Classification Search
CPC .......... G06F 11/3612; G06F 2221/033; G06F 11/3636; G06F 11/3466; G06F 11/347; G06F 11/362; G06F 11/3464; G06F 11/3644
USPC ................................................. 717/128, 129
See application file for complete search history.

(56) References Cited

U.S. PATENT DOCUMENTS

| 5,050,168 | A  | * | 9/1991 | Paterson | 714/35 |
|---|---|---|---|---|---|
| 6,536,036 | B1 | * | 3/2003 | Pavela | 717/125 |
| 7,581,209 | B2 |   | 8/2009 | Filho |  |
| 2002/0104074 | A1 |   | 8/2002 | Hundt et al. |  |
| 2003/0121011 | A1 |   | 6/2003 | Carter |  |
| 2003/0204836 | A1 | * | 10/2003 | Srivastava et al. | 717/124 |
| 2006/0225051 | A1 |   | 10/2006 | Kannan |  |

OTHER PUBLICATIONS

Tikir, et al. "Efficient Instrumentation for Code Coverage Testing", Proceedings of the 2002 ACM SIGSOFT international symposium on Software testing and analysis, vol. 27, Issue 04, Jul. 2002, pp. 1-11.
Artho, et al., "Combining Test Case Generation and Runtime Verification", Theoretical Computer Science—Abstract state machines and high-level system design and analysis, vol. 336, Issue 02-03, May 26, 2005, pp. 209-234.
"PyDbg", Retrieved at <<http://pedram.redhive.com/PyDbg/docs/>>, Retrieved Date: Feb. 16, 2011, pp. 1-3.
Cornett, Steve, "Code Coverage Analysis", Retrieved at <<http://www.bullseye.com/coverage.html, Retrieved Date: Jan. 11, 2006, pp. 1-12.
Godefroid, et al., "Automated Whitebox Fuzz Testing", Network Distributed Security Symposium (NDSS), Internet Society, Apr. 3, 2008, pp. 1-16.

* cited by examiner

*Primary Examiner* — Li B Zhen
*Assistant Examiner* — Hui-Wen Lin
(74) *Attorney, Agent, or Firm* — Dan Choi; Judy Yee; Micky Minhas

(57) ABSTRACT

A code coverage-based taint perimeter detection system and method for testing software code by determining code coverage and detecting new coverage of the code. Embodiments of the system and method perform tainted data flow analysis on execution traces of the code to determine tainted branch targets. The tainted branch targets may be filtered to remove any tainted branch targets that have already been covered. New coverage can be determined by monitoring the filtered tainted branch targets, which in some embodiments involves the use of software breakpoints that are automatically placed at the locations in the tainted branch targets at runtime. Embodiments of the system and method use an iterative process to ensure that only tainted branch targets that have not already been covered or tested are examined.

20 Claims, 4 Drawing Sheets

CODE COVERAGE-BASED TAINT PERIMETER DETECTION

BACKGROUND

Code coverage is a measure used in software testing that indicates the degree to which the source code of a computer program has been tested. Current code-coverage tools typically use either a modified execution environment (virtualized execution) or rely on various types of execution instrumentation to instrument the entire binary code, such as by inserting code to log coverage at the start of every basic block. Each of these current methods, however, has a non-zero runtime overhead. Runtime is the period during which a computer program is executing.

Code-coverage tools often use software breakpoints to record the execution of code deemed interesting by the user. In general, a breakpoint is a means of acquiring knowledge about a program during its execution. This is normally achieved by having the programmer manually insert (by manually indicating instruction addresses/offsets, function names, and so forth) breakpoints in the code. More particularly, a breakpoint is an intentional stopping or pausing place in a program that is placed there for debugging purposes. During the pause the programmer inspects the test environment to determine whether the program is functioning as expected.

One type of testing is fuzz testing. Conventional fuzz testing, or "fuzzing," is a technique used to test for security and reliability problems in software. It is an automated or semi-automated technique that uses invalid, unexpected, or random data as inputs to a computer program. This can be achieved by mutating good input for a program into possibly bad input. For example, fuzzing may involve changing small parts of a file and delivering that content to an application in an attempt to cause the application to crash. The program then is monitored for exceptions such as crashes or failing built-in code assertions.

"Smart" fuzzing, which is similar to conventional fuzzing, uses knowledge of the structure of the input data or feedback from the program under test to inform test case generation. Smarter fuzzing often enhances the code coverage when delivering fuzzed content by providing input that will match the expected input data structure more closely. Smart fuzzing is usually achieved by either requiring an extensive input structure definition to be provided at the start of fuzzing or with expensive runtime instrumentation and monitoring. Creating the input structure definitions requires significant engineering time. Typical runtime instrumentation and monitoring significantly increases the time needed to execute the program under test, which significantly reduces the fuzzing throughput.

One problem with conventional fuzzing and smart fuzzing techniques is that they are only as good as the input received. Both techniques typically start with a static set of inputs and then fuzz from this static set. This means that these techniques usually are fuzzing from the same starting point. This makes it difficult for the fuzzing to get better over time. Besides the actual crashes that are detected, one challenge is how to make progress into new areas that otherwise are covered. Detecting new coverage is desirable because it indicates an opportunity to find new bugs in the parts of the execution code previously untested through fuzzing.

One current technique that attempts to increase code coverage uses a constraint solver to try and solve the constraints generated from execution races. In other words, during the execution trace the tool logs all conditional branches in the execution flow and derives symbolic representations of the conditional (what is being compared). The constraint solver can then try to solve the inverse of that conditional (to figure out what input would cause the alternate branch to be taken). However, this constraint solver technique is expensive, degrades performance, and has limitations on what it can solve.

Another current technique modifies the binary code being tested to insert code. This inserted code then notifies the monitoring process the code that is actually being executed. However, this again is expensive and has the disadvantage that it modifies the binary code.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the code coverage-based taint perimeter detection system and method test software code by determining code coverage of the code. Embodiments of the system and method examine code coverage that has been seen across the inputs that have been executed in order to determine which tainted branch targets have never been covered. Embodiments of the system and method examine only tainted branches that have not already been covered or tested by the any of the previous inputs. This makes embodiments of the system and method more efficient than existing techniques that examine branches that have already been covered and tested.

Embodiments of the code coverage-based taint perimeter detection system and method limit the scope of consideration to new code coverage that is induced by tainted input controlled by a fuzzing tool. Embodiments of the system and method use tainted data flow analysis to determine code blocks that may be executed along an execution path that have not previously been executed. As a result, in some embodiments, software breakpoints are used to detect novel code execution. Software breakpoints are an instruction that the central processing unit (CPU) recognizes as triggering a break. Software breakpoints impose no runtime overhead except at startup and when actually triggered. This eliminates the general runtime overhead of existing solutions while providing new code execution detection of sufficient fidelity to provide feedback to an intelligent fuzz generator.

In general, embodiments of the code coverage-based taint perimeter detection system and method determine tainted branches of the software code by performing tainted data flow analysis on execution traces of the code. Conditional branch instructions where the branch taken is determined from tainted input are defined as "tainted branches." The code locations that result from the tainted branches are "tainted branch targets." Embodiments of the system and method then identify the tainted branch targets that have not yet been covered and detect when new inputs reach the intended tainted branch targets. This is achieved by monitoring program under test at the locations in the tainted branch targets not covered by existing inputs. In some embodiments the monitoring uses software breakpoints that are automatically placed at the locations in the tainted branches targets at runtime.

More specifically, embodiments of the system and method perform tainted data flow analysis on the execution traces to obtain tainted branch targets. The tainted branch targets are filtered and placed in a database, called a code coverage and tainted branch database. The filtering removes any tainted branch targets that are already covered.

A current taint perimeter is obtained using the data in the code coverage and tainted branch database. The current taint perimeter is the set of tainted branch targets that have not been covered with current inputs. The current taint perimeter is monitored during runtime by using the filtered tainted branch targets. In some embodiments, this monitoring yields locations in the code where software breakpoints can be inserted. These breakpoints are inserted automatically during runtime into the filtered tainted branch targets.

The monitoring process of embodiments of the system and method includes generating a new test case from a set of templates and then executing the new test case. From this execution of the new test case, it is determined whether new code coverage has been achieved. If so, then the set of templates is updated by adding the new test case to the set of templates. Moreover, the code coverage and tainted branch database is updated by adding the new code coverage to the database.

An updated taint perimeter is found from the updated set of templates and the updated database. Embodiments of the system and method then monitor the updated taint perimeter using newly filtered tainted branch targets. This iterative process continues until there are no more test cases. In this manner, embodiments of the system and method efficiently and effectively measure and extend the code coverage of the software code.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of a code coverage-based taint perimeter detection system and method reference is made to the accompanying drawings, which form a part thereof, and in which is shown by way of illustration a specific example whereby embodiments of the code coverage-based taint perimeter detection system and method may be practiced. It is to be understood that other embodiments may be utilized and structural changes may be made without departing from the scope of the claimed subject matter.

I. System Overview

Figure 1:
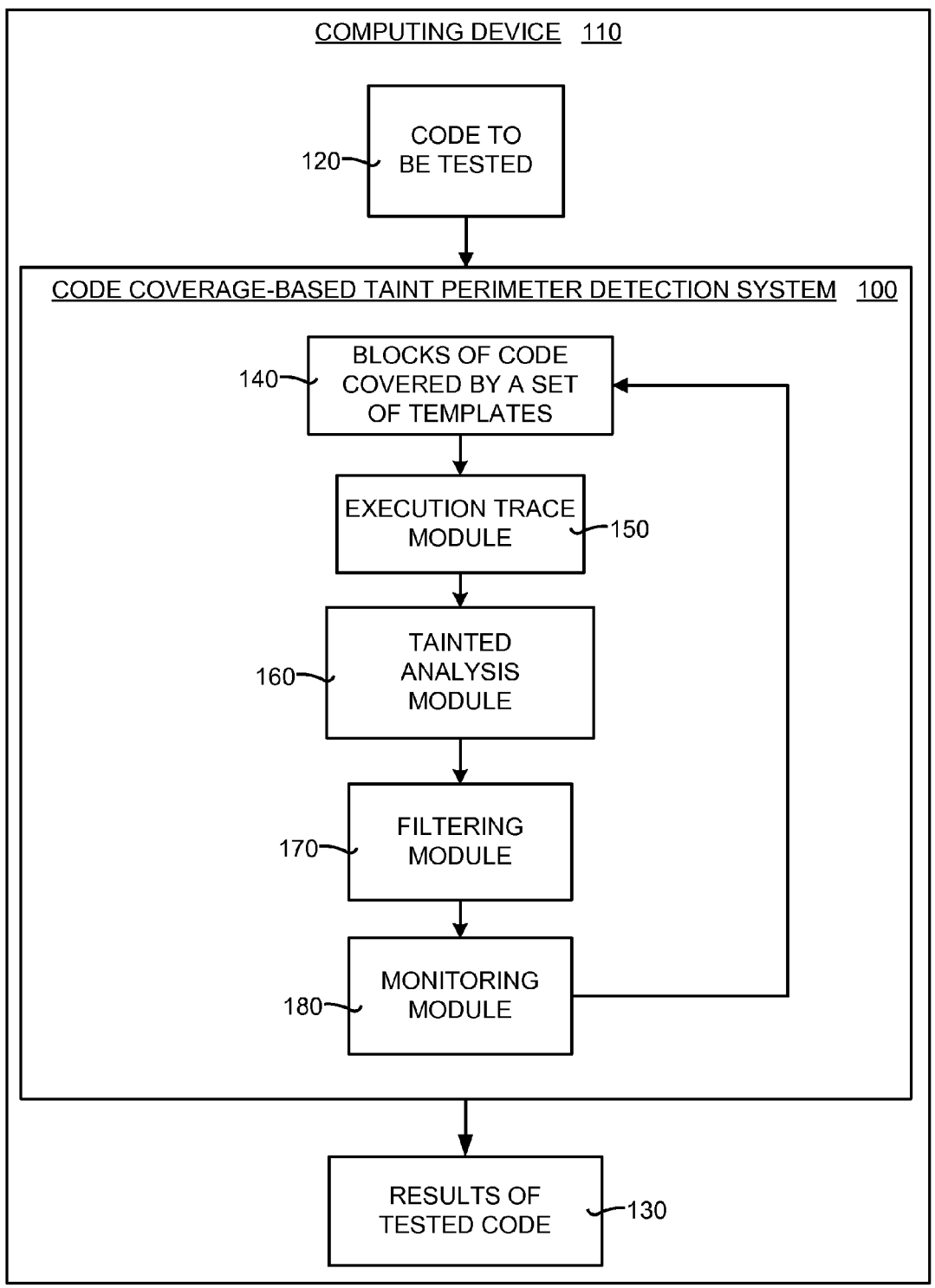
FIG. 1 is a block diagram illustrating a general overview of embodiments of the code coverage-based taint perimeter detection system and method implemented in a computing environment.

FIG. 1 is a block diagram illustrating a general overview of embodiments of the code coverage-based taint perimeter detection system and method implemented in a computing environment. As shown in FIG. 1, embodiments of the code coverage-based taint perimeter detection system 100 and method are implemented on a computing device 110. In general, embodiments of the code coverage-based taint perimeter detection system 100 and method input software code to be tested 120, process and test the code, and then output the tested code 130.

More specifically, embodiments of the code coverage-based taint perimeter detection system 100 and method measure the blocks of code covered by a set of templates 140. A template is a sample input that covers a part of the valid input range of the code to be tested 120. One at a time these templates are used to test the code that has not yet been tested.

Embodiments of the code coverage-based taint perimeter detection system 100 and method include an execution trace module 150, a tainted analysis module 160, a filtering module 170, and a monitoring module 180. The execution trace module 150 generates the execution traces for the template being used as input to the code to be tested 120. The tainted analysis module 160 performs tainted data flow analysis on the execution traces and determines tainted branch targets.

The filtering module 170 filters the tainted branch targets to ensure that any tainted branch targets that have already been covered are not included in a set of filtered tainted branch targets. The monitoring module 180 monitors a taint perimeter that is found using the filtered tainted branch targets to ensure detection of execution of code not previously covered. In some embodiments, this monitoring is performed using breakpoints that are automatically placed into the taint perimeter at runtime.

II. Operational Overview

Figure 2:
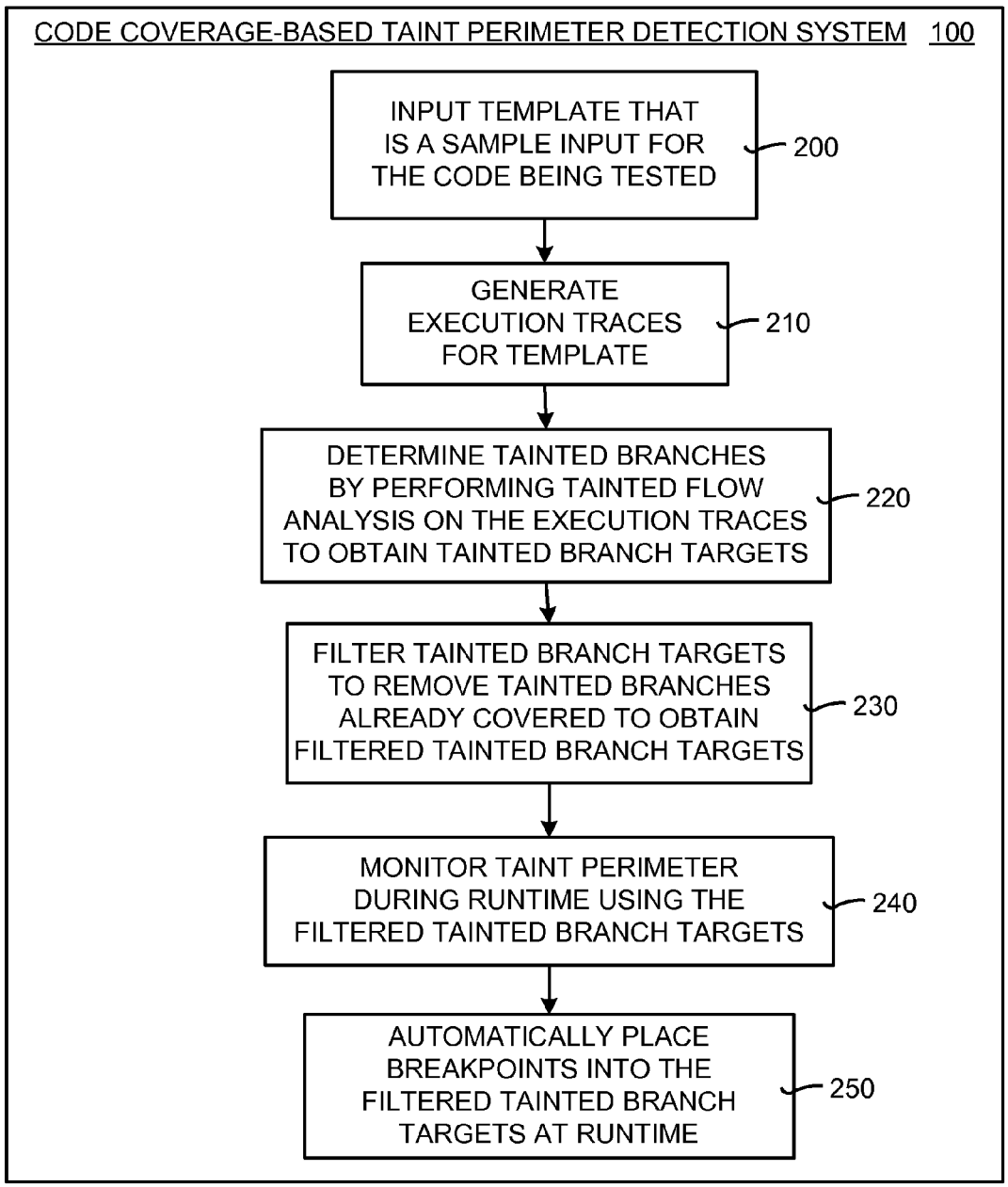
FIG. 2 is a flow diagram illustrating the general operation of embodiments of the code coverage-based taint perimeter detection system shown in FIG. 1.

FIG. 2 is a flow diagram illustrating the general operation of embodiments of the code coverage-based taint perimeter detection system 100 shown in FIG. 1. Embodiments of code coverage-based taint perimeter detection system 100 efficiently and effectively test software code without modification of binary code and by limiting the monitoring of branches of the code to those branches that have not been covered.

Referring to FIG. 2, the operation of embodiments of the code coverage-based taint perimeter detection system 100 begins by inputting a template that is a sample input for the code being tested (box 200). Next, execution traces are generated for the template (box 210). This yields the execution traces that are used in a tainted flow analysis.

Embodiments of the code coverage-based taint perimeter detection system 100 then determine tainted branches of the code by performing the tainted flow analysis on the execution traces (box 220). This tainted flow analysis yields tainted branch targets. The tainted branch targets then are filtered in order to remove those tainted branches of the code that have already been covered (box 230). Filtered tainted branches are obtained from this process.

Embodiments of the system 100 then monitor a taint perimeter of the code during runtime by using the filtered tainted branch targets (box 240). As explained in detail below, in some embodiments of the system 100 software breakpoints are used to monitor the taint perimeter. This is achieved by automatically placing the breakpoints into the filtered tainted branch targets during runtime (box 250). This facilitates the efficient and effective testing of the software code.

III. Operational Details

The operational details of embodiments of the code coverage-based taint perimeter detection system 100 and method will now be discussed. This includes the four main stages of generating execution traces, determining tainted branches, filtering the tainted branches, and monitoring the taint perimeter of the code.

III.A. Generating Execution Traces

The first stage of embodiments of the code coverage-based taint perimeter detection system 100 and method is to generate execution traces. This is achieved by obtaining an existing sample input that is known as a template. The template is an input that covers a part of the valid input range of the software code being tested. Execution traces are obtained from the software code being tested with the template as input using existing methods.

Figure 3:
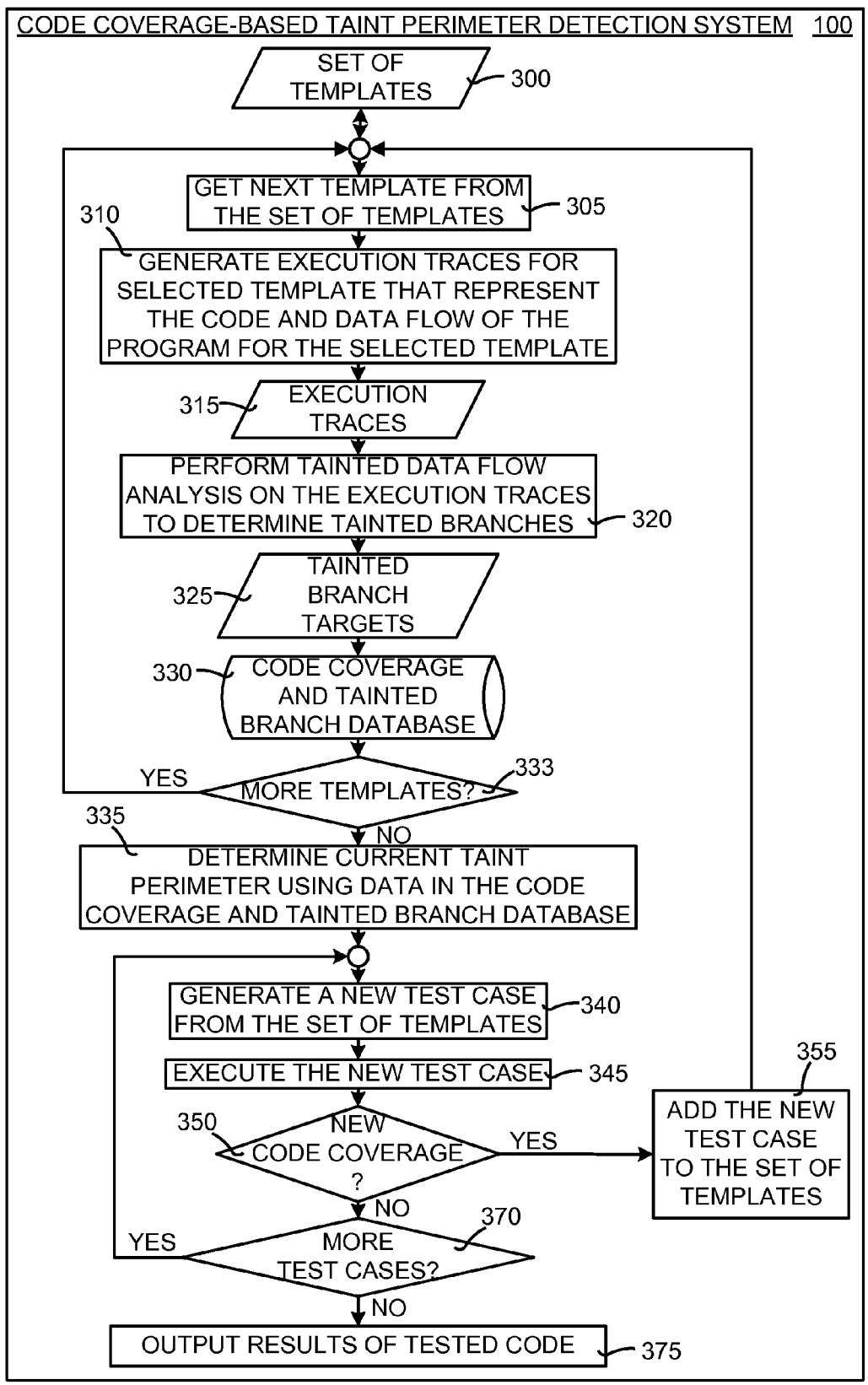
FIG. 3 is a flow diagram illustrating the operational details of embodiments of the code coverage-based taint perimeter detection system shown in FIGS. 1 and 2.

FIG. 3 is a flow diagram illustrating the operational details of embodiments of the code coverage-based taint perimeter detection system 100 and method shown in FIGS. 1 and 2. The operation of the system 100 begins by inputting a set of templates (box 300). Next, a template is selected from the set of templates (box 305). Execution traces then are generated for the selected template (box 310). The execution traces represent the code and data flow of the program for the selected template. The output is the execution traces (box 315).

III.B. Determining Tainted Branches

The second stage of embodiments of the code coverage-based taint perimeter detection system 100 and method is to perform tainted data flow analysis on the execution traces to find tainted branches. Referring to FIG. 3, embodiments of the system 100 and method perform tainted data flow analysis on the execution traces to determine tainted branches (box 320). This achieved by analyzing tainted instructions to identify tainted branches. A tainted instruction is any instruction that uses tainted data, which is any data that is controlled or comes from an external source (such as files). Embodiments of the system 100 and method focus not on all instructions but specifically on conditional branches.

By definition, tainted branches are conditional branches where the conditional is controlled by data that flows from an external source. For example, if a section of a file is read, and then if that section of the file says "ABC" go down one path and "DEF" go down another path, then this is a tainted branch. The tainted data flow analysis is performed on each of the execution traces in order to determine each of the tainted branches.

Referring to FIG. 3, embodiments of the system 100 and method output tainted branch targets as a result of the tainted data flow analysis (box 325). These tainted branch targets are stored in a code coverage and tainted branch database (box 330). Embodiments of the system 100 and method repeat the process of generating execution traces and determining tainted branches as long as there are more templates (box 333) to trace and analyze.

III.C. Filtering Tainted Branches

The third stage of embodiments of the code coverage-based taint perimeter detection system 100 and method is to filter the tainted branches found in the earlier stage. Filtering takes the tainted branch targets found during the second stage and strips or filters the branches that have already been covered. In other words, the tainted branch targets that have been covered within the aggregated coverage from the full template set are removed. This is filtering the tainted branch targets.

As discussed above, embodiments of the system 100 and method output tainted branch targets as a result of the tainted data flow analysis (box 325) and store them in a code coverage and tainted branch database (box 330). The current taint perimeter then is determined using data in the code coverage and tainted branch database (box 335) by removing tainted branch targets that have been covered.

Filtering of the tainted branches comes into play when there are new tainted branches from new inputs that are discovered during execution in the fourth stage, or the monitoring stage, as described below. When new tainted branches are found, then the filtering process is run again. Embodiments of the system 100 and method uniquely use the trace analysis to find the tainted branches and then filter the tainted branches to exclude covered blocks from all the runs. The result is that filtered tainted branches are found.

III.D. Monitoring the Taint Perimeter of the Code

The fourth stage of embodiments of the code coverage-based taint perimeter detection system 100 and method is to monitor the taint perimeter of the software code. The taint perimeter is generated using the filtered tainted branches found in the earlier stage.

With the filtered tainted branches, embodiments of the system 100 and method know both the code that will execute under test conditions and the new code that has not been seen before. Given this information, embodiments of the system 100 and method can monitor for new code coverage in a targeted way without the need to watch every block that executes when the test is actually run.

Embodiments of the system 100 and method generate a new test case from the set of templates (box 340). Next, the new test case is executed (box 345). A determination then is made as to whether there is new code coverage (box 350). If there is new code coverage, then the new test case is added to the set of templates (box 355). In addition, the generating execution traces, determining tainted branches and filtering tainted branches stages will be executed using the new template, resulting in an updated taint perimeter based on the execution data flow from the new template. Future test cases generating in the monitoring the taint perimeter stage will benefit from this refined taint perimeter.

If there is no new code coverage, then another determination is made as to whether there are more test cases (box 370). If so, then embodiments of the system 100 and method go back to the process of generating a new test case from the set of templates (box 340). The process then continues from that point as described thus far. If there are no more test cases, then the process is completed for the time and results of the tested code are output (box 375).

In some embodiments of the system 100 and method software breakpoints are used in the monitoring process. A software breakpoint is one way of monitoring when a particular piece of code actually executes. Other embodiments of the system 100 and method use other types of monitoring processes.

For embodiments that use breakpoints, embodiments of the system 100 and method to automatically determine where to insert the breakpoints. Because filtered tainted branch targets are used, embodiments of the system 100 and method use a much smaller number of breakpoints than would otherwise be used.

Breakpoints are automatically inserted as follows. By definition, for a tainted conditional branch instruction, there is a side of the branch that was taken and one side that was not taken. For a given filtered tainted branch target in the set of filtered tainted branch targets identified earlier, embodiments of the system 100 and method automatically place the breakpoints at every filtered tainted branch target.

During testing if the new code is executed for one of the filtered tainted branches and it takes the non-taken conditional branch, then embodiments of the system 100 and method send an alert from the breakpoint that the path was taken and that new coverage was achieved. Thus, breakpoints are only placed at non-taken branches of a tainted branch. Note that the non-taken branches refer to not just the path not taken in one particular input file, but the path that was not taken in any of the files in the set of templates. If the both branches of a tainted conditional branch instruction were taken, then no breakpoint is set.

When new coverage is detected, embodiments of the system 100 and method recalculate which pieces of code have not been covered even with the new coverage. This typically is performed in an iterative manner, as explained above. Also, when new coverage is taken, embodiments of the system 100 and method generate a new execution trace and find a new set of filtered tainted branches. Thus, new coverage may either narrow the set of breakpoints already set or also may expand it by providing additional filtered tainted branch targets to analyze.

IV. Exemplary Operating Environment

Figure 4:
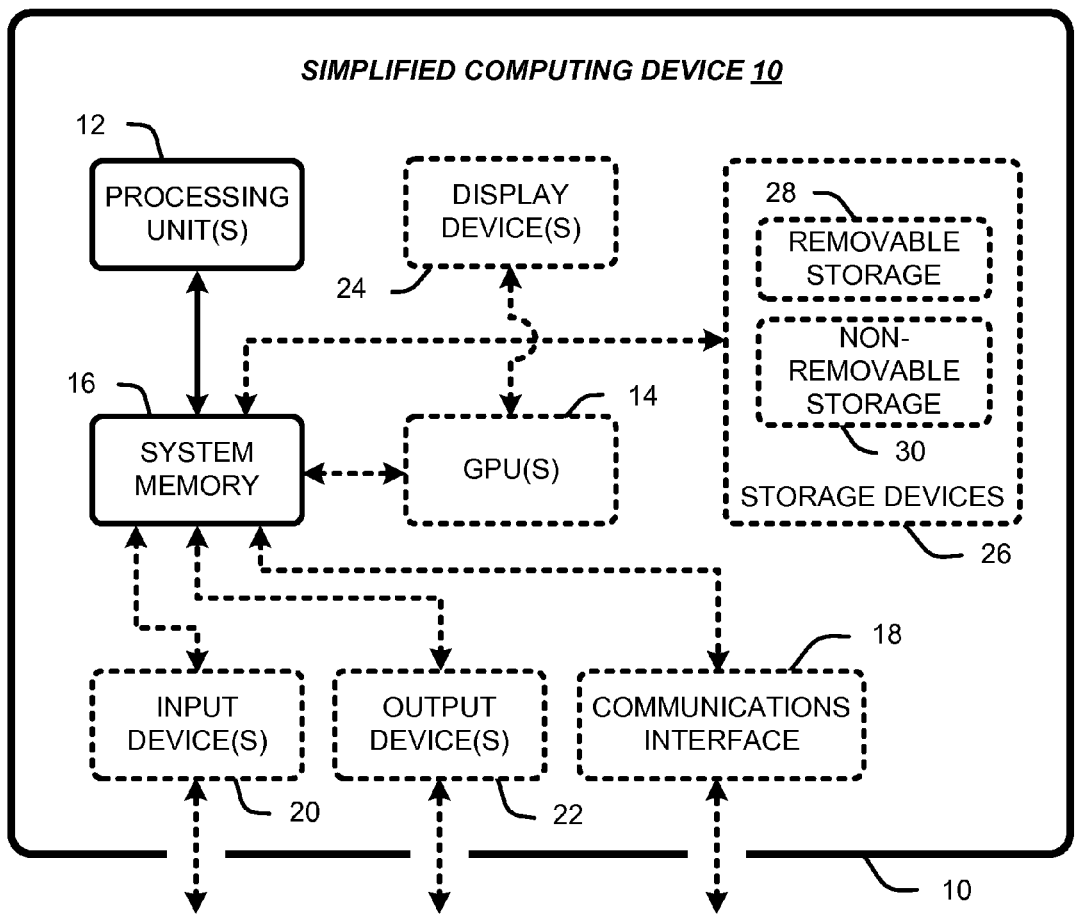
FIG. 4 illustrates a simplified example of a general-purpose computer system on which various embodiments and elements of the code coverage-based taint perimeter detection system and method, as described herein and shown in FIGS. 1-3, may be implemented.

Embodiments of the code coverage-based taint perimeter detection system 100 and method described herein are operational within numerous types of general purpose or special purpose computing system environments or configurations. FIG. 4 illustrates a simplified example of a general-purpose computer system on which various embodiments and elements of the code coverage-based taint perimeter detection system 100 and method, as described herein and shown in FIGS. 1-3, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement embodiments of the code coverage-based taint perimeter detection system 100 and method described herein, the device should have a sufficient computational capability and system memory to enable basic computational operations. In particular, as illustrated by FIG. 4, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 18. The simplified computing device of FIG. 4 may also include one or more conventional computer input devices 20 (e.g., pointing devices, keyboards, audio input devices, video input devices, haptic input devices, devices for receiving wired or wireless data transmissions, etc.). The simplified computing device of FIG. 4 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 4 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the code coverage-based taint perimeter detection system 100 and method described herein, or portions thereof, may be stored, received, transmitted, or read from any desired combination of computer or machine readable media or storage devices and communication media in the form of computer executable instructions or other data structures.

Finally, embodiments of the code coverage-based taint perimeter detection system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by at least one computing device, the method comprising:
   generating multiple execution traces of software code using a set of multiple different inputs to the software code;
   determining tainted branch targets by performing data flow analysis on the multiple execution traces of the software code, the tainted branch targets being associated with tainted conditional branches in the software code;
   filtering the tainted branch targets to identify a taint perimeter of the software code, the taint perimeter comprising a subset of the tainted branch targets that have not been covered by the multiple different inputs;
   automatically placing breakpoints into the taint perimeter during runtime of the software code while the software code is currently executing on the at least one computing device;
   upon triggering of an individual breakpoint in the taint perimeter when executing the software code using a particular input, detecting that new code from the software code has been covered by the particular input;
   generating a new execution trace for the new code;
   performing additional data flow analysis on the new execution trace to identify additional tainted branch targets in the new code;
   filtering the additional tainted branch targets to identify an updated taint perimeter of the software code;
   automatically placing a new breakpoint into the updated taint perimeter; and
   upon triggering of the new breakpoint when executing the software code using a further input, detecting that further new code from the software code has been covered by the further input.

2. The method of claim 1, further comprising monitoring the breakpoints in the taint perimeter to detect when the new code is covered.

3. The method of claim 1, wherein the set of multiple different inputs comprises a set of templates that are existing valid inputs for the software code.

4. The method of claim 3, further comprising generating a new test case from the set of templates, the new test case comprising the further input.

5. The method of claim 4, further comprising:
   responsive to detecting that the further new code is covered by the further input, adding the further input to the set of templates.

6. The method of claim 5, further comprising adding the new code and the further new code to a code coverage and tainted branch database.

7. The method of claim 1, wherein the filtering the tainted branch targets comprises removing individual tainted conditional branch targets that have already been covered from the taint perimeter.

8. The method of claim 1, wherein the determining the tainted branch targets comprises determining that the tainted branch targets are controlled by external data and excluding, from the tainted branch targets, some other branch targets in the software code that are not controlled by the external data.

9. At least one computer-readable volatile memory, non-volatile memory, hard drive, or optical disk storing computer-executable instructions which, when executed by at least one processing unit, cause the at least one processing unit to perform acts comprising:
   generating one or more execution traces of software code using a set of multiple different inputs to the software code;
   determining tainted branch targets by performing data flow analysis on the one or more execution traces of the software code, the tainted branch targets being associated with one or more tainted conditional branches in the software code;
   filtering the tainted branch targets to identify a taint perimeter of the software code, the taint perimeter comprising a subset of the tainted branch targets that have not been covered by the multiple different inputs;
   automatically placing breakpoints into the taint perimeter during runtime of the software code;
   upon triggering of a first breakpoint in the taint perimeter using a first input, detecting that additional code from the software code has been covered by the first input;
   generating another execution trace for the additional code;
   determining additional tainted branch targets in the additional code by performing additional data flow analysis on the another execution trace;
   filtering the additional tainted branch targets to identify an updated taint perimeter of the software code;
   automatically placing a second breakpoint into the updated taint perimeter; and
   upon triggering of the second breakpoint when executing the software code using a second input, detecting that further additional code from the software code has been covered by the second input.

10. The at least one computer-readable volatile memory, non-volatile memory, hard drive, or optical disk of claim 9, the acts further comprising:
    placing the subset of the tainted branch targets in a code coverage and tainted branch database; and
    determining the taint perimeter using the code coverage and tainted branch database.

11. The at least one computer-readable volatile memory, non-volatile memory, hard drive, or optical disk of claim 9, wherein the set of multiple different inputs is a set of templates that are existing valid inputs for the software code.

12. The at least one computer-readable volatile memory, non-volatile memory, hard drive, or optical disk claim 11, the acts further comprising:
    adding the second input to the set of templates responsive to detecting that the further additional code has been covered by the second input.

13. The at least one computer-readable volatile memory, non-volatile memory, hard drive, or optical disk of claim 9, wherein the data flow analysis comprises excluding, from the tainted branch targets, some other branch targets in the software code that are not controlled by external data.

14. A system comprising:
one or more processing units; and
at least one computer-readable volatile memory, non-volatile memory, hard drive, or optical disk storing computer-executable instructions which, when executed by the one or more processing units, cause the one or more processing units to:
obtain first execution traces of software code, the first execution traces reflecting execution of the software code using multiple inputs;
using first data flow analysis on the first execution traces, determine first tainted branch targets in the software code;
filter the first tainted branch targets to identify a first taint perimeter comprising a subset of the first tainted branch targets that have not been covered by the multiple inputs;
automatically place a first breakpoint in the first taint perimeter;
responsive to the first breakpoint in the first taint perimeter being triggered by an additional input, detect that the additional input causes additional code of the software code to be executed;
obtain a second execution trace of the additional code of the software code;
using second data flow analysis on the second execution trace, determine second tainted branch targets in the additional code of the software code;
filter the second tainted branch targets to identify a second taint perimeter comprising a subset of the second tainted branch targets that have not been covered by the multiple inputs and the additional input;
automatically place a second breakpoint in the second taint perimeter; and
responsive to the second breakpoint in the second taint perimeter being triggered by a further additional input, detect that the further additional input causes further additional code of the software code to be executed.

15. The system of claim 14, embodied as a single computer.

16. The system of claim 14, wherein the computer-executable instructions cause the one or more processing units to:
perform both the first data flow analysis and the second data flow analysis, the first data flow analysis comprising evaluating first data flow through the software code in the first execution traces and the second data flow analysis comprising evaluating second data flow through the software code in the second execution trace.

17. The system of claim 14, wherein the computer-executable instructions cause the one or more processing units to:
iteratively refine the second taint perimeter by inserting subsequent breakpoints into the software code, executing the software code using subsequent inputs, and identifying subsequent additional code coverage when the subsequent inputs trigger the subsequent breakpoints.

18. The system of claim 14, wherein the computer-executable instructions cause the one or more processing units to:
place multiple third breakpoints into a third taint perimeter, the third taint perimeter comprising the further additional code.

19. The system of claim 14, wherein the additional code is not executed in any of the first execution traces.

20. The system of claim 19, wherein the further additional code is not executed in any of the first execution traces and also is not executed in the second execution trace.

* * * * *